United States Patent [19]

Malik

[11] Patent Number: 4,531,957
[45] Date of Patent: Jul. 30, 1985

[54] FILTERING MATERIAL AND FILTRATION APPARATUS EMPLOYING THE FILTERING MATERIAL

[76] Inventor: Abdul Malik, 1417 Appleberry Way, West Chester, Pa. 19380

[21] Appl. No.: 570,379

[22] Filed: Jan. 13, 1984

[51] Int. Cl.³ .................. B01D 39/08; B01D 46/02
[52] U.S. Cl. .................................... 55/360; 55/378; 55/382; 55/486; 55/491; 55/524; 55/DIG. 43; 55/DIG. 44; 210/489; 210/505; 428/235; 428/282; 428/300; 428/458
[58] Field of Search .............. 55/131, 360, 378, 382, 55/486, 491, 524, 527, 528, DIG. 43–DIG. 45; 210/489–491, 505; 428/234, 235, 280, 282, 300, 457, 458, 138, 922, 935–937

[56] References Cited

U.S. PATENT DOCUMENTS

| | | | |
|---|---|---|---|
| 2,573,964 | 11/1951 | Green et al. | 55/524 |
| 3,589,975 | 6/1971 | Andrews et al. | 428/458 |
| 3,986,530 | 10/1976 | Maekawa | 55/360 |
| 4,136,222 | 1/1979 | Jonnes | 428/138 |
| 4,211,661 | 7/1980 | Perry | 55/486 |
| 4,322,232 | 3/1982 | Beane | 55/360 |
| 4,324,574 | 4/1982 | Fagan | 55/528 |

FOREIGN PATENT DOCUMENTS

| | | | |
|---|---|---|---|
| 2232178 | 1/1973 | Fed. Rep. of Germany | 55/524 |
| 2423211 | 12/1975 | Fed. Rep. of Germany | 428/458 |

Primary Examiner—David L. Lacey
Attorney, Agent, or Firm—Ratner & Prestia

[57] ABSTRACT

Filtering material and filtration apparatus employing the filtering material. The filtering material includes a perforated laminate of a plastic sheeting and a metalized coating adhesively attached to a fabric backing. A filter bag formed from this filtering material is mounted within a support structure so that the metalized coating is electrically connected to the support structure.

14 Claims, 3 Drawing Figures

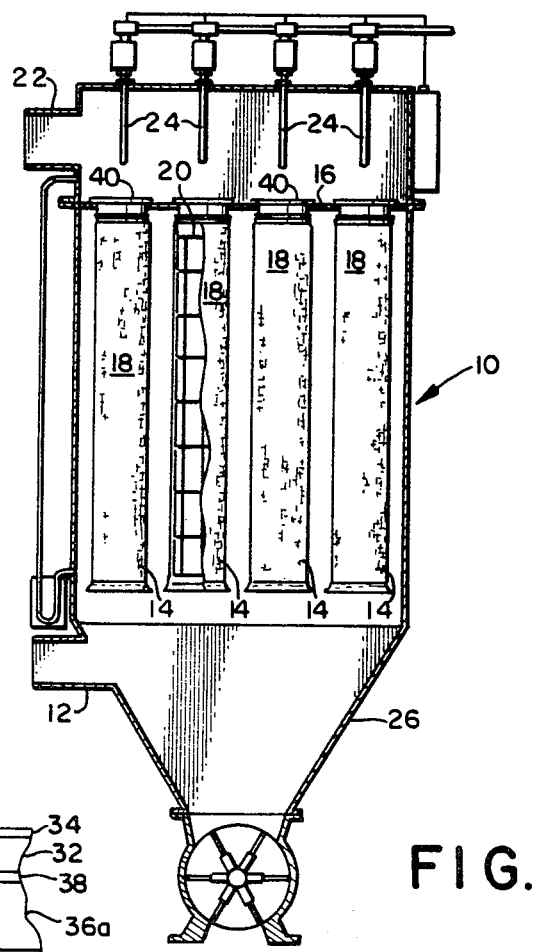
FIG. 1
FIG. 2
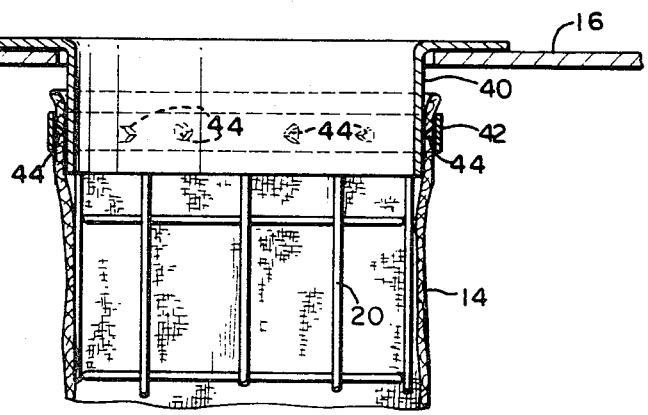
FIG. 3

FILTERING MATERIAL AND FILTRATION APPARATUS EMPLOYING THE FILTERING MATERIAL

DESCRIPTION

TECHNICAL FIELD

The present invention relates, in general, to pollution control apparatus and, in particular, to filtration materials for collecting particulate matter entrapped in a gas or a liquid which is to be cleaned. Although the invention will be described for use in air pollution control, it will be apparent that the invention also in applicable to other pollution controls.

BACKGROUND ART

The separation of dusts from industrial-gas streams often is done by using filters made of natural or synthetic fibers. It is common to shape the filter elements as bags and place them in structural enclosures called baghouses. Besides providing support for the filter elements, baghouses contain baffles which direct air-flow into and out of the filter elements. Also, the baghouses include equipment for cleaning the filter bags and means for collecting and discharging the dust removed from the filter bags.

Baghouses are used when dust-laden air is to be discharged to the atmosphere or when valuable particulate matter is to be recovered from a process venting system. The sizes of baghouses may range from small bin-venting filters to large multicompartment filters that receive dust-laden air from extensive systems of exhaust ducts.

Dust filtration in baghouses is accomplished by passing the dust-laden air through a filter fabric that is in the form of a cylindrical tube or an oblong bag. As the air passes through the fabric, the dust is retained on the surface and in the interstices of the fabric. A filter cake builds up which also acts as a filter medium. The filter cake is dislodged periodically. Otherwise, the build-up of filter cake would cut off air flow through the filter bag. p In the past, filter fabrics have been selected based upon various properties judged to be important for the particular applications by the designers of the pollution control systems. Among the properties considered are:

permeability-the fabric should be sufficiently porous to permit the desired flow of air, mechanical strength-the fabric should resist the tensile forces caused by operating pressure differentials, by mechanical shaking during cleaning, and by pulsing during reverse air-flow and the fabric should withstand abrasion when it is clamped to and supported by the housing structure and when it is subjected to the impact of the filtered material, corrosion resistance-the fabric should resist attack and weakening due to chemical action caused by the filtered materials, especially if moisture is present due to condensation, heat resistance-for some processes, the fabric is exposed to high-temperature exhaust gases, cleanability-the fabric should have a surface texture that is conducive to rapid release of the filter cake during cleaning and the fabric also should have a high rate of electrostatic-charge dissipation so as to shed charged dust particles, dimensional stability-the fabric should resist stretching or shrinking that would affect its permeability.

Various filter fabrics have been suggested and used in the past. In one commonly used arrangement, a microporous teflon sheeting is secured to a suitable substrate. A limitation of this and other similar filters using microporous materials is that the permeability of the filter is established as the microporous material is manufactured. Consequently, there is limited, if any, flexibility in selecting the desired porosity of the filter as it is fabricated.

Another problem with filters which are in use currently is the tendency to build up and retain electrostatic charge. Although consideration is given, in the selection of materials used as filter fabrics, to the rate of dissipation of electrosatic charge when the filters are being cleaned, the filters are not arranged to prevent entirely or reduce significantly the tendency or building up large electrostatic charges. Consequently, there remains the hazzard to those who clean such filters or maintain the baghouse of highly charged filters.

DISCLOSURE OF THE INVENTION

Accordingly, it is an object of the present invention to provide new and improved pollution control apparatus.

It is another object of the present invention to provide a new and improved filter fabric for pollution control apparatus.

It is a further object of the present invention to provide a filter fabric arranged to permit selection of a desired porosity.

It is yet another object of the present invention to provide a filter fabric arranged to prevent entirely or, at least, reduce signifcantly the tendency of electrostatic charge build-ups.

It is a still further object of the present invention to provide a filter fabric which is relatively simple in construction and inexpensive to fabricate.

These an other objects are achieved, according to the present invention, by a layered article comprising a perforated laminate of plastic sheeting and a metalized coating adhesively attached to a fabric backing. This layered article may be formed into an air filter bag and secured to a support structure in a dust collecting system by means of a strap which contacts the metalized coating, whereby the metalized coating is electrically connected to the support structure by contact of the strap with the support structure.

BRIEF DESCRIPTION OF DRAWING

Referring to the drawing:

FIG. 1 is a vertical section of a baghouse showing four hanging bags;

FIG. 2 is a cross-sectional view of a layered article constructed in accordance with the present invention; and FIG. 3 is an enlarged vertical section showing the manner in which a bag is mounted in a baghouse in accordance with the present invention.

BEST MODE OF CARRYING OUT THE INVENTION

FIG. 1 is a vertical section of a baghouse 10 used for removing particulate matter from a gas stream. Dust-laden air enters baghouse 10 through an inlet 12 and is distributed to a plurality of bags 14 which hang downward from a platform 16. Bags 14 include a filter fabric 18 mounted on a wire basket 20. The bottoms of the bags are closed.

Air-flows into the bags and particulate matter is collected on the outside surface of the filter fabric and within the thickness of the filter fabric. Clean air exits from the tops of the bags and is exhausted through an outlet 22. A conventional blower arrangement may be employed to develop the desire air-flow through baghouse 10.

In order to prevent the bags from clogging up entirely, they are cleaned from time-to-time as conditions dictate. This may be accomplished manually or by some suitable mechanical arrangement or by reverse air-flow, as shown, or by a combination of the foregoing. Air under pressure is introduced through a plurality of nozzles 24 positioned at the tops of the bags. At the same time, the bags may be shaked. The combination of reverse air-flow and bag shaking is effective to blow out particulate matter captured within the filter fabric and break loose filter cake formed on the outside surface of the bags. The particulate matter dislodged from the bags falls downward and is collected in a hopper 26 at the bottom of the baghouse.

Referring to FIG. 2, a filter fabric constructed in accordance with the present invention is seen to be a layered article 30 comprised of a perforated laminate of plastic sheeting 32 and a metalized coating 34 attached to a fabric backing 36 by means of an adhesive 38. Plastic sheeting 32 may be a polyester, such as the material sold under the trademark MYLAR. Metalized coating 34 may be aluminum. Fabric backing 36 may be composed of a needle felt 36a supported by a scrim 36b or it may be an unsupported needle felt. Fabric backing 36 also may be a woven industrial fabric.

One way of forming the perforated laminate of plastic sheeting 32 and metalized coating 34 is to needle-punch the laminate. The desired porosity is determined by hole size and hole density. Although the location of holes by needle punching is somewhat random, the overall operation is controlled, so that the desired porosity may be developed.

FIG. 3 shows the manner in which a bag 14, formed from the filter fabric of FIG. 2, may be mounted in a baghouse. Bag 14 is suspended from platform 16 by means of collar 40. Bag 14 is secured to collar 40 by a strap 42 which has a plurality of barbs 44. As strap 42 is tightened over bag 14 to clamp the bag to collar 40, barbs 44 penetrate the filter fabric and make electrical contact with the collar. Barbs 44 are effective in electrically connecting metalized coating 34 to collar 40. Collar 40, in turn, is in electrical contact with platform 16 which is a part of baghouse 10. Thus, if the baghouse structure is grounded, bags 14 within the baghouse also are grounded.

Metalized coating 34 is particularly useful if the polluted air is heated or contains cinders. Under such conditions, the metalized coating provides more heat resistance and reduces substantially fire hazzard than would be the case if only a bare plastic sheeting was used.

While in the foregoing there have been described preferred embodiments of the present invention, it should be understood to those skilled in the art that various modifications and changes can be made without departing from the true spirit and scope of the invention as recited in the claims.

What is claimed:

1. A layered article comprising a laminate of a plastic sheeting and an exposed metalized coating adhesively attached to a fabric backing, said laminate having pin hole perforations extending through both said plastic sheeting and said metalized coating.

2. A layered article according to claim 1 wherein said plastic sheeting is a polyester.

3. A layered article according to claim 2 wherein said metalized coating is aluminum and said plastic sheeting is adjacent said fabric backing.

4. A layered article according to claim 3 wherein said fabric backing includes a needle felt.

5. A layered article according to claim 4 wherein said fabric backing further includes a scrim which supports said needle felt.

6. A layered article according to claim 3 wherein said fabric backing includes a woven industrial fabric.

7. Filtering material comprising:
   a fabric backing;
   and a laminate of a plastic sheeting and an exposed metalized coating adhesively attached to said fabric backing, said laminate having needle holes extending through its thickness.

8. Filtering material according to claim 7 wherein said plastic sheeting is a polyester.

9. Filtering material according to claim 8 wherein said metalized coating is aluminum and said plastic sheeting is adjacent said fabric backing.

10. Filtering material according to claim 9 wherein said fabric backing includes a needle felt.

11. Filtering material according to claim 10 wherein said fabric backing further includes a scrim which supports said needle felt.

12. Filtering material according to claim 9 wherein said fabric backing includes a woven industrial fabric.

13. Filtration apparatus comprising:
   a filter bag comprising a perforated laminate of a plastic sheeting and a metalized coating adhesively attached to a fabric backing;
   a housing structure within which said filter bag is mounted, said housing structure having an inlet through which fluid is introduced into said housing structure and an outlet through which fluid exits from said housing structure;
   mounting means for mounting said filter bag within said housing structure and for electrically connecting said metalized coating to said housing structure.

14. Filtration apparatus according to claim 13 wherein said mounting means include (a) a cylindrical collar fitted within said filter bag, and (b) a strap surrounding said filter bag and clamping said filter bag to said collar and including barbs which penetrates said filter bag and contacts said collar.

* * * * *